(12) United States Patent
Farsio

(10) Patent No.: US 6,561,467 B1
(45) Date of Patent: May 13, 2003

(54) QUICK-RELEASE VARIABLE POSITION SLIDABLE SCOOTER JACKSTAND

(76) Inventor: Amir Farsio, 18402 Llagas Creek Dr., Morgan Hill, CA (US) 95037

(*) Notice: Subject to any disclaimer, the term of this patent is extended or adjusted under 35 U.S.C. 154(b) by 0 days.

(21) Appl. No.: 09/662,667

(22) Filed: Sep. 15, 2000

(51) Int. Cl.⁷ .............................................. A45D 19/04
(52) U.S. Cl. ...................................... 248/127; 280/301
(58) Field of Search ........................... 248/127, 346.01, 248/293; 280/301

(56) References Cited

U.S. PATENT DOCUMENTS

| | | | | |
|---|---|---|---|---|
| 1,584,096 A | * | 5/1926 | Henderson | |
| 2,074,422 A | * | 3/1937 | Pawsat | 208/75 |
| 2,202,426 A | * | 5/1940 | Pawsat | 280/301 |
| 2,456,536 A | * | 12/1948 | Schwinn | 280/301 |
| 3,652,105 A | * | 3/1972 | Homlong | 280/301 |
| 4,591,180 A | * | 5/1986 | Copple | 280/293 |
| 5,501,479 A | * | 3/1996 | Fehrenbach et al. | 280/293 |
| 5,992,864 A | * | 11/1999 | Dickson et al. | 280/87.041 |

FOREIGN PATENT DOCUMENTS

| | | | |
|---|---|---|---|
| EP | 0 238 354 A2 | * | 9/1987 |
| WO | WO 90/10569 | * | 9/1990 |

* cited by examiner

Primary Examiner—Ramon O. Ramirez
Assistant Examiner—Kofi Schulterbrandt
(74) Attorney, Agent, or Firm—Ali Kamarei

(57) ABSTRACT

The invention discloses a quick release jack stand assembly for releasable attachment to the foot board of a scooter wherein the jack stand assembly further comprises a side bracket having a scooter engagement track, wherein the scooter engagement track substantially conforms to the shape of the scooter footboard, the scooter engagement track further comprising a releasable attachment mechanism device for securing the scooter foot board to the scooter engagement track of the jack stand assembly; and a prop bar for engaging a ground surface when the scooter is to be maintained in an upright position when the prop bar is in a down rest position. In an embodiment, the scooter engagement track is slidable along the length of the scooter foot board when the attachment mechanism is in a release position and can be positioned along any portion of the scooter foot board.

17 Claims, 3 Drawing Sheets

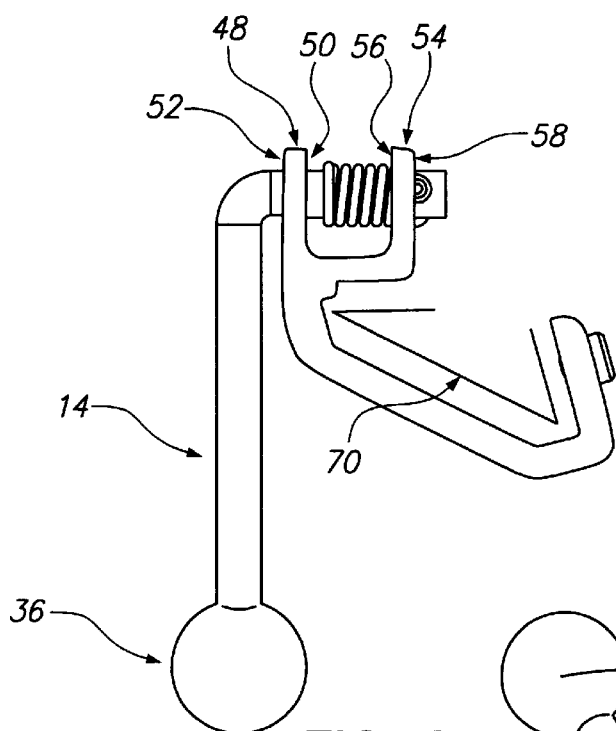
FIG. 3
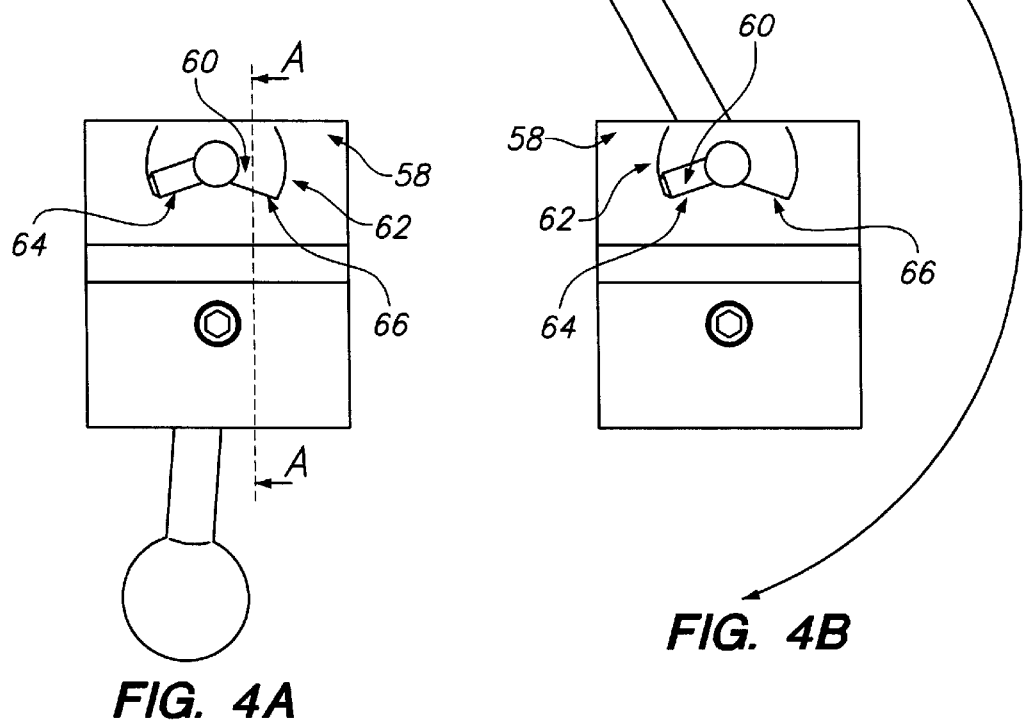
FIG. 4A
FIG. 4B

QUICK-RELEASE VARIABLE POSITION SLIDABLE SCOOTER JACKSTAND

BACKGROUND

The use of jack stands for maintaining the upright position of a two-wheeled vehicle during periods of non-use of the two-wheeled vehicle is common. Various types of jack stands have been described including those in U.S. Pat. No. 4,971,347 to Cline, U.S. Pat. No. 5,388,848 to Silva, Des. 294,014 to McMurtery, and U.S. Pat. No. 4,655,472 to Pletscher.

Recently, there has been an increase in use of the two-wheeled vehicles, especially non-motorized foot powered scooters. The reason for the increase in use of these types of scooters has been due to the size of these scooters and their popularity because these foot powered scooters are adjustable and they can be folded into a compact positions. Riders are able to use the scooters for short distances, fold the scooter into a compact assembly during commute in public transportation and quickly assemble the scooter after the public transportation ride for getting to their home or office.

Furthermore, the existing jack stands are attached to their two-wheeled vehicle in a fixed position and cannot be placed in various positions. This poses difficulties for the users who may be either right footed or left footed or would have an easier time manipulating the jack stand if it were on the front or back of the two-wheeled vehicles.

Finally, often when children are not riding their scooters, the scooters are left on the ground surface making the scooters dirty or laid against automobiles, doors, or home interior walls where the surface of the automobile, doors, or home interior walls are scratched causing damage.

Therefore, a first objective of the invention is to provide a jack stand that can be placed in various positions along the length of the two-wheeled vehicle such that manipulation of the jack stand by foot is easiest and most convenient for both left footed and right-footed riders.

Another objective of the invention is to provide a jack stand that is quickly released from the scooter for storage of the scooter during periods of non-use.

SUMMARY

A quick release jack stand assembly for releasable attachment to the foot board of a scooter wherein the jack stand assembly further comprises a side bracket having a scooter engagement track, wherein the scooter engagement track substantially conforms to the shape of the scooter footboard, the scooter engagement track further comprising a releasable attachment mechanism device for securing the scooter foot board to the scooter engagement track of the jack stand assembly; and a prop bar for engaging a ground surface when the scooter is to be maintained in an upright position when the prop bar is in a down rest position. In an embodiment, the scooter engagement track is slidable along the length of the scooter footboard when the attachment mechanism is in a release position and can be positioned along any portion of the scooter footboard.

In yet another embodiment, the scooter engagement track has an inner lip elongate, a track member elongate, and an outer lip elongate. In another embodiment, the inner lip elongate, outer member elongate, and track member elongate substantially form an open triangle. In another embodiment, the inner lip elongate, outer member elongate, and track member elongate substantially form a "U" shape.

In a preferred embodiment the scooter engagement track has a threaded bore and a threaded set screw wherein during attachment of the jack stand assembly to the scooter foot board, the scooter foot board is inserted into the scooter engagement track, the inner lip elongate of the scooter engagement track buttressing against a bottom side of the scooter foot board and the outer lip elongate of the scooter engagement track buttressing against a top side of the scooter foot board.

In this embodiment, the jack stand assembly is releasably attached to a right side or left side of the scooter footboard. In a preferred embodiment the jack stand assembly is releasably attached to any portion along the length of the side of the scooter footboard. In a preferred embodiment, the bumper connected to the prop bar has a ground surface contact area between 0.25 and 21 square centimeters. In a more preferred embodiment, the bumper has a ground surface contact area between 1 and 10 square centimeters.

In an embodiment, the prop bar has an axel end and a stand arm. In a preferred embodiment, the axel end and the stand arm form a 90-degree angle. In an embodiment an up rest position is 180 degrees opposite from the down rest position.

In a preferred embodiment the prop bar rests in three positions. Preferably, the third rest position is 90 degrees from the down rest position and 270 degrees from the up rest position. In another embodiment, the prop bar rests in four positions. In this embodiment, the fourth rest position is 270 degrees from the down rest position and the 90 degrees from the up rest position.

BRIEF DESCRIPTION OF THE DRAWINGS

FIG. 3 shows a front view of an embodiment of the quick release jack stand assembly.

FIGS. 4a and 4b show the cam area and the up and down grooves that engage the spring pin.

DETAILED DESCRIPTION

Figure 1:
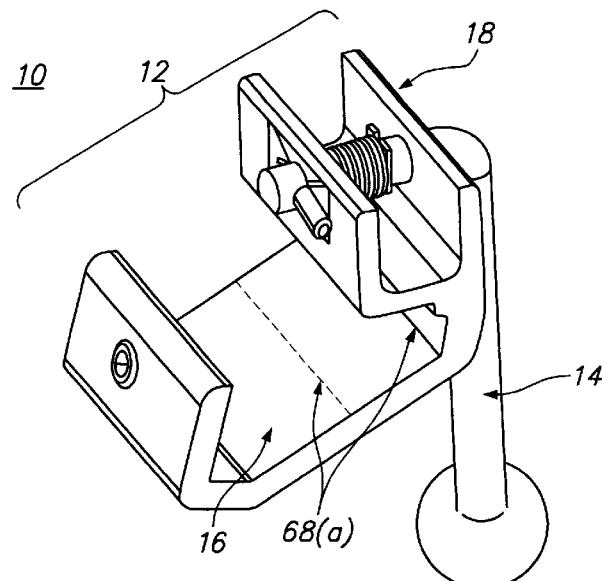
FIG. 1 shows an assembled embodiment of the quick release jack stand assembly.

As shown in FIG. 1, the invention comprises of a jack stand assembly 10 having a side bracket 12 and a prop bar 14. Side bracket 12 further comprises a scooter engagement track 16 and prop bar mechanism housing 18.

The side bracket 12 is preferably composed of 6061 T6 type aluminum or any other material that is capable of withstanding the weight of the scooter during scooter the "up" or non-use position (Position 2). The scooter engagement track 16 of side bracket 12 is designed to receive and therefore its shape substantially conforms to the shape of the foot deck of the scooter. In an embodiment, the scooter engagement track 16 has an inner lip elongate 20, an outer lip elongate 22, and track member elongate 68. The edges of inner lip elongate 20, outer lip elongate 22, and track member elongate 68 come together in their longitudinal axis 68(a). In an embodiment the inner lip elongate 20 and track member elongate 68 form a 40 degree to 45-degree angle. In the same embodiment outer lip elongate 20 and track member elongate 68 between approximately 40 degree to 45-degree angle. Therefore, the inner lip elongate 20, the outer lip elongate 22 and track member elongate 68 walls substantially form an "open" triangle 70 shown in FIG. 3.

In another embodiment, the inner lip elongate 20 and track member elongate 68 form a 90 angle. In the same embodiment outer lip elongate 22 and track member elongate 68 form a 90-degree angle. Therefore, the inner lip elongate 20, the outer lip elongate 22 and track member elongate 68 walls substantially form a "U." Preferably the inner lip elongate 20 further has a threaded bore 24 designed to receive a threaded set screw 26. The threaded set screw 26 has a screw tip 28 and is preferably composed of commercially available alloy steel. In other embodiments, the inner lip elongate 20 has two or more threaded bores 24 to receive two or more threaded set screws 26. Therefore, in order to attach the jack stand assembly to the scooter, the scooter engagement track 16 of side bracket 12 is slid over the scooter foot board such that inner lip elongate 20 is adjacent to and abuts the bottom side of the foot board of the scooter and the outer lip elongate 22 is adjacent to and abuts the top side of the foot board of the scooter. While in this position, set screw 26 is tightened such that the screw tip 28 is pressed against the bottom side of the scooter foot board and outer lip elongate 22 of scooter engagement track 16 is pressed against the top side of the scooter foot board. Set screw 26 is tightened sufficiently such that the jack stand assembly 10 is attached to the scooter footboard.

For quick release of the jack stand assembly 10 from the scooter foot board, set screw 16 is rotated in the opposite direction until the screw tip 28 of set screw 26 disengages from the bottom side of the scooter foot board. It is understood that if the shape of the right side of the scooter foot board and the left side of the scooter foot board are mirror images of each other, which is often the case, the jack stand assembly is optionally attached to either the right hand side or left hand side of the scooter foot board. This feature accommodates both left footed and right footed scooter riders.

In a different embodiment, the outer lip elongate 22 is provided with threaded bore 24 to receive the threaded set screw 26. In yet another embodiment, the inner lip elongate 20 is adjacent to and abuts the top side of the scooter foot board and the outer lip elongate 22 is adjacent to and abuts the bottom side of the scooter foot board.

Figure 2:
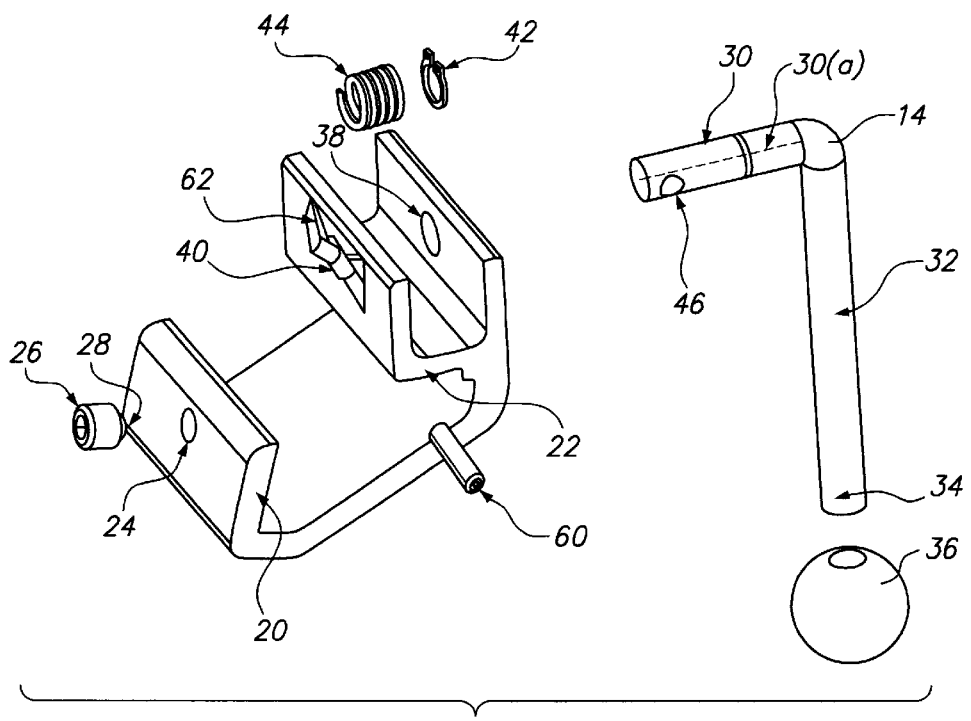
FIG. 2 shows a disassembled embodiment of the quick release jack stand assembly.

As shown in FIG. 2, in an embodiment, prop bar 14 has an axel end 30 and a stand arm 32. Preferably, the axel end 30 and stand arm 32 are at a 90 degree angle from each other such that rotation of the axel end 30 around the axel end axis 30(a) causes the stand arm 32 to move in a circular direction. The axel end 30 of prop bar 14 is received by the prop bar mechanism housing 18. The stand arm 32 of prop bar 14 has a pedestal portion 34 that engages the ground surface in order to maintain the scooter in an upright position. The pedestal portion 34 of stand arm 32 optionally receives a bumper 36, which is optionally composed of various types of commercially available rubber or plastic material. Furthermore, the bumper 36 optionally has a large surface area to create a larger contact area with the ground surface in order to provide greater stability when the scooter is in rest or non-use position.

The prop bar mechanism housing 18 is preferably integral with scooter engagement track 16. As shown in FIGS. 2 and 3, in a preferred embodiment the prop bar mechanism housing 18 further has a first rim 48 having a first rim inner surface 50, a first rim outer surface 52, and first support bore 38, and a second rim 54 having a second rim inner surface 56, a second rim outer surface 58, and a second support bore 40. The axel end 30 of prop bar 14 is first inserted into the first support bore 38 of prop bar mechanism housing 18 and then through snap ring 42 and compression spring 44.

Finally, the axel end 30 of prop bar 14 is inserted through second support bore 38. Axel end 30 is of sufficient length such that when it is inserted through the second support bore 40, spring pin bore 46 is adjacent to second rim outer surface 58. Spring pin 60 is then inserted into spring pin bore 46 of axel end 30 to attach the prop bar 18 to the side bracket 12. Second rim outer surface 58 preferably has a "stamped" cam area 62 having a first groove 64 and a second groove 66. The first groove 64 and second groove 66 of cam area 62 engage the spring pin 60 during the two down and up positions where the spring pin comes into a rest position. When the spring pin 60 comes into a rest position, the prop bar 14 remains in a fixed position. In another embodiment, more than two grooves are "stamped" into the cam area 62 of second rim outer surface 58, thereby creating additional rest positions for spring pin 60 and prop bar 32.

Figure 5:
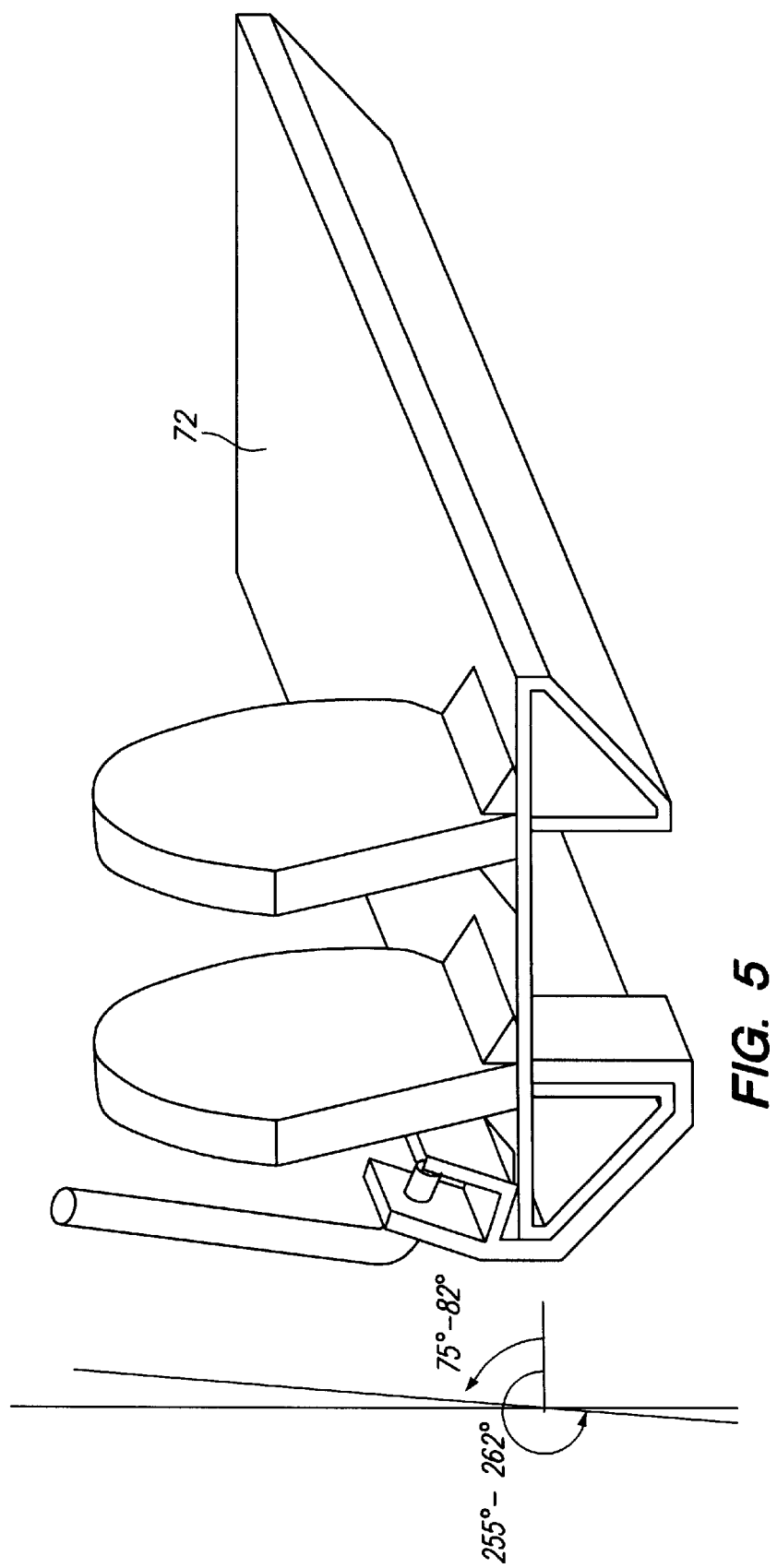
FIG. 5 shows attachment of the jack stand assembly to the scooter footboard and the prop bar in the up position.

As shown in FIGS. 4a and 4b, the mechanism of the quick release jack stand assembly so described provides the mechanism such that when prop bar 14 is rotated in the clock or counter-clock wise fashion from the "up" position 2 to the "down" position 1, spring pin 60 rotates against second rim outer surface 58 cam area 62 causing compression spring 44 to be compressed. In the "down" position 1 the tension of the compression spring 44 is at it's highest. As the prop bar 14 is rotated to the "down" position 1, spring pin 60 snaps into down groove 66 in cam area 62. In the "up" position 2, which is the desirable position when the rider is riding the scooter, the compression spring 44 is at its lowest tension, and spring pin 60 snaps into up groove 64 of cam area 62. As shown in FIG. 5, assuming that the plane of the scooter foot board is parallel to the ground surface, when the prop bar is in the "up" position 2, the prop bar 14 has an angle of 75 to 82 degrees from the plane of the surface of the scooter foot board. Conversely, when the prop bar is in the "down" position, the prop bar has an angle of 255 to 262 degrees from the plane of the scooter foot board 72.

Although the invention has been described with respect to particular embodiments of a quick release slidable jack stand, it is appreciated that various modifications of the jack stand assembly are possible without deviating from the invention as defined by the claims set forth below.

What is claimed is:

1. A quick release jack stand assembly for releasable attachment to the foot board of a scooter wherein the jack stand assembly further comprises;

(a) a side bracket having a scooter engagement track, wherein the scooter engagement track substantially conforms to the shape of the scooter footboard, the scooter engagement track further comprising a releasable attachment mechanism device for securing the scooter foot board to the scooter engagement track of the jack stand assembly; and (b) a prop bar for engaging a ground surface when the scooter is to be maintained in an upright position when the prop bar is in a down rest position, (c) the scooter engagement track having an inner lip elongate, a track member elongate, and an outer lip elongate wherein during attachment of the jack stand assembly to the scooter foot board, the scooter foot board is inserted into the scooter engagement track, the inner lip elongate of the scooter engagement track buttressing against a bottom side of the scooter foot board and the outer lip elongate of the scooter engagement track buttressing against a top side of the scooter foot board.

2. The assembly of claim 1 wherein the scooter engagement track is slidable along the length of the scooter foot board when the attachment mechanism is in a release position.

3. The assembly of claim 1 wherein the inner lip elongate, outer member elongate, and track member elongate substantially form an open triangle.

4. The assembly of claim 1 wherein the inner lip elongate, outer member elongate, and track member elongate substantially form a "U" shape.

5. The assembly of claim 1 wherein the scooter engagement track has a threaded bore and a threaded set screw.

6. The assembly of claim 1 wherein the jack stand assembly is releasably attached to a right side of the scooter foot board.

7. The assembly of claim 1 wherein the jack stand assembly is releasably attached to a left side of the scooter foot board.

8. The assembly of claim 1 wherein the jack stand assembly is releasably attached to any portion along the length of the side of the scooter foot board.

9. The device of claim 1 wherein the stand base has a ground surface contact area between 0.25 and 21 square centimeters.

10. The device of claim 1 wherein the stand base has a surface area between 1 and 10 square centimeters.

11. The assembly of claim 1 wherein the prop bar has an axel end and a stand arm.

12. The assembly of claim 1 wherein the axel end and the stand arm form a 90 degree angle.

13. The assembly of claim 1 wherein an up rest position is 180 degrees opposite from the down rest position.

14. The assembly of claim 1 wherein the prop bar rests in three positions.

15. The assembly of claim 14 wherein the third rest position is 90 degrees from the down rest position and 270 degrees from the up rest position.

16. The assembly of claim 1 wherein the prop bar rests in four positions.

17. The assembly of claim 16 wherein the fourth rest position is 270 degrees from the down rest position and 90 degrees from the up rest position.

\* \* \* \* \*